United States Patent
Kubo et al.

(10) Patent No.: US 8,365,570 B2
(45) Date of Patent: Feb. 5, 2013

(54) CAN BODY FOR LAMINATED STEEL SHEET TWO-PIECE CAN AND METHOD FOR MANUFACTURING CAN BODY

(75) Inventors: Hiroshi Kubo, Tokyo (JP); Katsumi Kojima, Tokyo (JP); Yuka Nishihara, Tokyo (JP); Yoshihiko Yasue, Tokyo (JP); Hiroki Iwasa, Tokyo (JP)

(73) Assignee: JFE Steel Corporation (JP)

( * ) Notice: Subject to any disclaimer, the term of this patent is extended or adjusted under 35 U.S.C. 154(b) by 775 days.

(21) Appl. No.: 11/990,375

(22) PCT Filed: Aug. 10, 2006

(86) PCT No.: PCT/JP2006/316114
§ 371 (c)(1),
(2), (4) Date: Feb. 12, 2008

(87) PCT Pub. No.: WO2007/020946
PCT Pub. Date: Feb. 22, 2007

(65) Prior Publication Data
US 2009/0127272 A1   May 21, 2009

(30) Foreign Application Priority Data
Aug. 12, 2005  (JP) .................................. 2005-234552

(51) Int. Cl.
*B21D 22/30* (2006.01)
*B21D 22/20* (2006.01)

(52) U.S. Cl. ............... 72/348; 72/46; 72/379.4; 72/715; 72/342.1

(58) Field of Classification Search .................... 72/715, 72/46, 379.4, 342.1; 413/69, 76
See application file for complete search history.

(56) References Cited

U.S. PATENT DOCUMENTS

| | | | | |
|---|---|---|---|---|
| 1,375,305 A | * | 4/1921 | Maisel | 72/349 |
| 4,584,859 A | * | 4/1986 | Saunders | 72/349 |
| 4,962,659 A | * | 10/1990 | Imazu et al. | 72/349 |
| 5,014,536 A | * | 5/1991 | Saunders | 72/349 |
| 5,061,140 A | * | 10/1991 | Hamaguchi et al. | 72/349 |
| 5,072,605 A | * | 12/1991 | Imazu et al. | 72/347 |
| 5,083,449 A | * | 1/1992 | Kobayashi et al. | 72/349 |
| 5,105,645 A | * | 4/1992 | Kobayashi et al. | 72/348 |
| 5,179,854 A | * | 1/1993 | Matsui et al. | 72/349 |
| 5,724,848 A | * | 3/1998 | Aschberger | 72/348 |

(Continued)

FOREIGN PATENT DOCUMENTS

| | | |
|---|---|---|
| JP | 59-35344 B2 | 8/1984 |
| JP | 61-22626 A | 1/1986 |

(Continued)

*Primary Examiner* — Dana Ross
*Assistant Examiner* — Pradeep C Battula
(74) *Attorney, Agent, or Firm* — DLA Piper LLP (US)

(57) ABSTRACT

A method for manufacturing a can body by forming a circular laminated steel sheet having a radius of $R_0$ includes producing a form at least one time with a laminated steel sheet coated with a polyester resin, which has a plane orientation coefficient of 0.06 or less such that that the height h, the maximum radius r, and the minimum radius d of the form satisfy $d \leq r$, $0.2 \leq d/R \leq 0.5$, and $1.5 \leq h/(R-r) \leq 2.5$, where R represents the radius of the laminated steel sheet having a weight equivalent to the weight of a final form; heating the resulting form at least one time at a temperature of 150° C. or higher, and lower than or equal to the melting point of the polyester resin; and working the heat-treated form into a form satisfying $d \leq r$, $0.1 \leq d/R \leq 0.25$, and $1.5 \leq h/(R-r) \leq 4$.

4 Claims, 1 Drawing Sheet

U.S. PATENT DOCUMENTS

| | | | |
|---|---|---|---|
| 5,753,328 A * | 5/1998 | Miyazawa et al. | 72/46 |
| 5,778,723 A * | 7/1998 | Diekhoff | 72/356 |
| 6,463,776 B1 * | 10/2002 | Enoki et al. | 72/379.4 |
| 7,354,234 B2 * | 4/2008 | Fujishige et al. | 72/379.4 |
| 2006/0277957 A1 * | 12/2006 | Fujishige et al. | 72/46 |
| 2009/0217729 A1 * | 9/2009 | Kojima et al. | 72/349 |

FOREIGN PATENT DOCUMENTS

| | | |
|---|---|---|
| JP | 7-106394 A | 4/1995 |
| JP | 2526725 B2 | 6/1996 |
| JP | 8-309465 A | 11/1996 |
| JP | 2001-246695 A | 9/2001 |
| JP | 2004-148324 A | 5/2004 |

* cited by examiner

CAN BODY FOR LAMINATED STEEL SHEET TWO-PIECE CAN AND METHOD FOR MANUFACTURING CAN BODY

RELATED APPLICATION

This is a §371 of International Application No. PCT/JP2006/316114, with an international filing date of Aug. 10, 2006 (WO 2007/020946 A1,published Feb. 22, 2007), which is based on Japanese Patent Application No. 2005-234552, filed Aug. 12, 2005.

TECHNICAL FIELD

This disclosure relates to a can body for a laminated steel sheet two-piece can and a method for manufacturing the same, wherein the can body has a high strain comparable to that of a two-piece can for an aerosol can.

BACKGROUND

Metal cans are roughly classified into two-piece cans and three-piece cans. The two-piece can refers to a can composed of two parts of a can body with an integral can bottom and a lid. The three-piece can refers to a can composed of three parts of a can barrel, a top lid, and a bottom lid. The can body of the two-piece can has beautiful appearance because no seam portion (welded portion) is included. However, a high strain level is usually required. The can barrel of the three-piece can is inferior in appearance to the two-piece can because a seam portion is included. However, the strain level is usually low. Consequently, two-piece cans are used for small-capacity, high-quality goods in many cases and three-piece cans are used for large-capacity, low-price goods in many cases, as a trend in the market.

In general, expensive, thick aluminum sheets are used as metal materials for can bodies for two-piece cans, e.g., aerosol cans, wherein the strain in drawing is high and a degree of elongation in a can height direction is large (hereafter may be referred to as high strain), among such two-piece cans. Inexpensive, thin steel sheet materials, e.g., tinplate and tin-free steel, are hardly used. The reason therefor is that the strain of the aerosol two-piece can is very high, and it is difficult to apply high degree of working, e.g., drawing or DI (draw and ironing), to the steel sheet, whereas an impact forming method can be applied to soft metal materials, e.g., aluminum.

Under such circumstances, if the can body of the above-described high-strain two-piece can is allowed to be produced by using an inexpensive, thin, high-strength steel sheet material, e.g., tinplate or tin-free steel, the industrial significance is very high.

In a previously known technology, a common low-strain two-piece can is produced from a resin-laminated steel sheet (may be referred to as a laminated steel sheet) serving as a raw material by a drawing method or a DI method.

For example, Japanese Examined Patent Application Publication No. 7-106394, Japanese Patent No. 2526725, Japanese Unexamined Patent Application Publication No. 2004- and Japanese Examined Patent Application Publication Nos. 59-35344 and 61-22626 disclose the drawing method or the DI method of resin-coating metal sheets. However, in every technology, targets are beverage cans, food cans, and the like, and are low-strain can bodies which do not require such a high strain level applied to two-piece aerosol cans.

Japanese Examined Patent Application Publication No. 7-106394 discloses a method in which a can body is formed by performing draw and ironing of a laminated steel sheet with a drawing die having a specific shape. Low-strain can bodies are formed by this method with no problem. However, if the method is applied to high-strain cans, e.g., aerosol cans, cracking, peeling, or the like occurs in a film during working.

Japanese Patent No. 2526725 and Japanese Unexamined Patent Application Publication No. 2004-148324 disclose that a heat treatment is performed in a working stage or a final stage for the purpose of preventing peeling of a resin layer and ensuring a barrier function after working. That is, in Japanese Patent No. 2526725, an orientational thermoplastic resin is used and a heat treatment for relaxing the internal stress and facilitating orientational crystallization is proposed. This heat treatment method is a technique which is generally used for beverage cans and the like at present. According to the description of Japanese Patent No. 2526725, it is desirable that the heat treatment is performed in the state of a cup subjected to redrawing at (melting point−5° C.) or lower at which an increase in crystallinity of the coating resin is facilitated adequately. However, it is clear that merely low-strain products are targeted, insofar as the description of the examples is concerned.

In the examples disclosed in Japanese Unexamined Patent Application Publication No. 2004-148324, a resin composed of a compound of a saturated polyester and an ionomer is disposed as a coating layer and working by DI is performed. In the working method of Japanese Unexamined Patent Application Publication No. 2004-148324, a heat treatment is performed following the drawing, and subsequently, working by DI, necking, and flanging are performed. However, it is also clear that merely low-strain products are targeted, insofar as the description of the examples is concerned.

Furthermore, in the methods described in Japanese Examined Patent Application Publication Nos. 59-35344 and 61-22626, after a can is formed, the resulting can is heat-treated mainly at a temperature higher than or equal to the melting point of a resin so as to relax the internal stress. However, the strain of the resulting can body is low insofar as the descriptions of the specification and the examples are concerned.

That is, at present, there is no method for manufacturing a can body of a high-strain two-piece can, e.g., an aerosol can, by using a laminated steel sheet.

We attempted to produce high-strain two-piece cans, wherein a circular laminated steel sheet was used and formed into the shape of a hollow cylinder with a bottom and, thereafter, the diameter of a portion in the vicinity of the opening portion was reduced. As a result, peeling and breakage of the resin layer occurred. These were problems specific to forming with high strain level. We believed that a heat treatment would be effective for overcoming the problem. However, previously known heat treatments after and before the forming were unsatisfactory, and we were not able to avoid peeling of the resin layer in a high-strain region. Consequently, the resin layer peeling problem was not able to be solved even when the prior art was applied. Furthermore, a problem also occurred in that the workability of the resin layer deteriorated in steps downstream from the heat treatment step.

It could therefore be advantageous to provide a can body for a laminated steel sheet two-piece can and a method for manufacturing the same, wherein the can body has a high-strain comparable to that of a two-piece can for aerosol, and peeling and breakage of a resin layer do not occur.

SUMMARY

We provide a method for manufacturing a can body for a two-piece can which may use multistage forming of a circular laminated steel sheet having a radius of $R_0$, the method including the steps of producing a form at least one time by using a laminated steel sheet coated with a polyester resin, which has a plane orientation coefficient of 0.06 or less, in such a way that the height h, the maximum radius r, and the minimum radius d of the form satisfy $d \leq r$, $0.2 \leq d/R \leq 0.5$, and $1.5 \leq h/(R-r) \leq 2.5$, where R represents the radius of the laminated steel sheet having a weight equivalent to the weight of a final form; heat-treating the resulting form at least one time at a temperature of 150° C. or higher, and lower than or equal to the melting point of the polyester resin; and working the heat-treated form into a form satisfying $d \leq r$, $0.1 \leq d/R \leq 0.25$, and $1.5 \leq h/(R-r) \leq 4$.

In the above-described manufacturing method, preferably, the temperature of the heat-treating is within the above-described temperature range and higher than or equal to (the melting point of the polyester resin−30° C.), and the working condition of the heat-treated form is $d \leq r$, $0.1 \leq d/R \leq 0.25$, and $2.0 \leq h/(R-r) \leq 4$.

In these manufacturing methods, preferably, the heat-treated form is cooled to a temperature lower than or equal to the glass transition point of the polyester resin within 10 seconds after the heat treatment is completed.

In each of the above-described manufacturing methods, preferably, the polyester resin having a plane orientation coefficient of 0.06 or less is a resin in which primary components of polymerization are terephthalic acid and at least one type of diol selected from ethylene glycol and butylene glycol. In this case, more preferably, the polyester resin having a plane orientation coefficient of 0.06 or less is a copolymer in which secondary component is at least one type selected from the group consisting of diethylene glycol, cyclohexanediol, and isophthalic acid.

In each of the above-described manufacturing methods, preferably, the polyester resin having a plane orientation coefficient of 0.06 or less further includes an incompatible resin having a glass transition point of 5° C. or lower as a subphase.

A can body for a two-piece can is produced by any one of the above-described methods.

Another method for manufacturing a two-piece can is a method by using multistage forming of a circular sheet of a laminated steel sheet so as to finally produce a final form having a height h, a maximum radius r, and a minimum radius d (including the case where r and d are equal), the method including the steps of using a laminated steel sheet coated with a polyester resin having a plane orientation coefficient of 0.06 or less, forming the laminated steel sheet within a range suitable for allowing the height h, the maximum radius r, and the minimum radius d of the final form to satisfy the relationships of $0.1 \leq d/R \leq 0.25$ and $1.5 \leq h/(R-r) \leq 4$ relative to the radius R of the circular sheet before forming, the weight of the circular sheet being equivalent to the weight of the final form, and heat-treating a form at least one time in such a way that the temperature of the form becomes 150° C. or higher, and lower than or equal to the melting point of the polyester resin in at least one intermediate forming stage in which the height h, the maximum radius r, and the minimum radius d (including the case where r and d are equal) of the form in the intermediate forming stage satisfy the relationships of $0.2 \leq d/R \leq 0.5$ and $1.5 \leq h/(R-r) \leq 2.5$ relative to the above-described radius R.

DETAILED DESCRIPTION

We conducted intensive research and, as a result, in production of a high-strain container, e.g., a can body of a two-piece can for aerosol, from a resin-laminated steel sheet, it was found that peeling and breakage of the resin could be suppressed even in downstream forming steps, in which the strain was allowed to increase more, by subjecting the can body to an intermediate forming, which satisfied a specific working condition, to a specific heat treatment during forming, rather than simple performance of a multistage forming method, in which the strain was allowed to sequentially increase.

Our methods and two-piece cans will be described below in detail.

Figure 1:
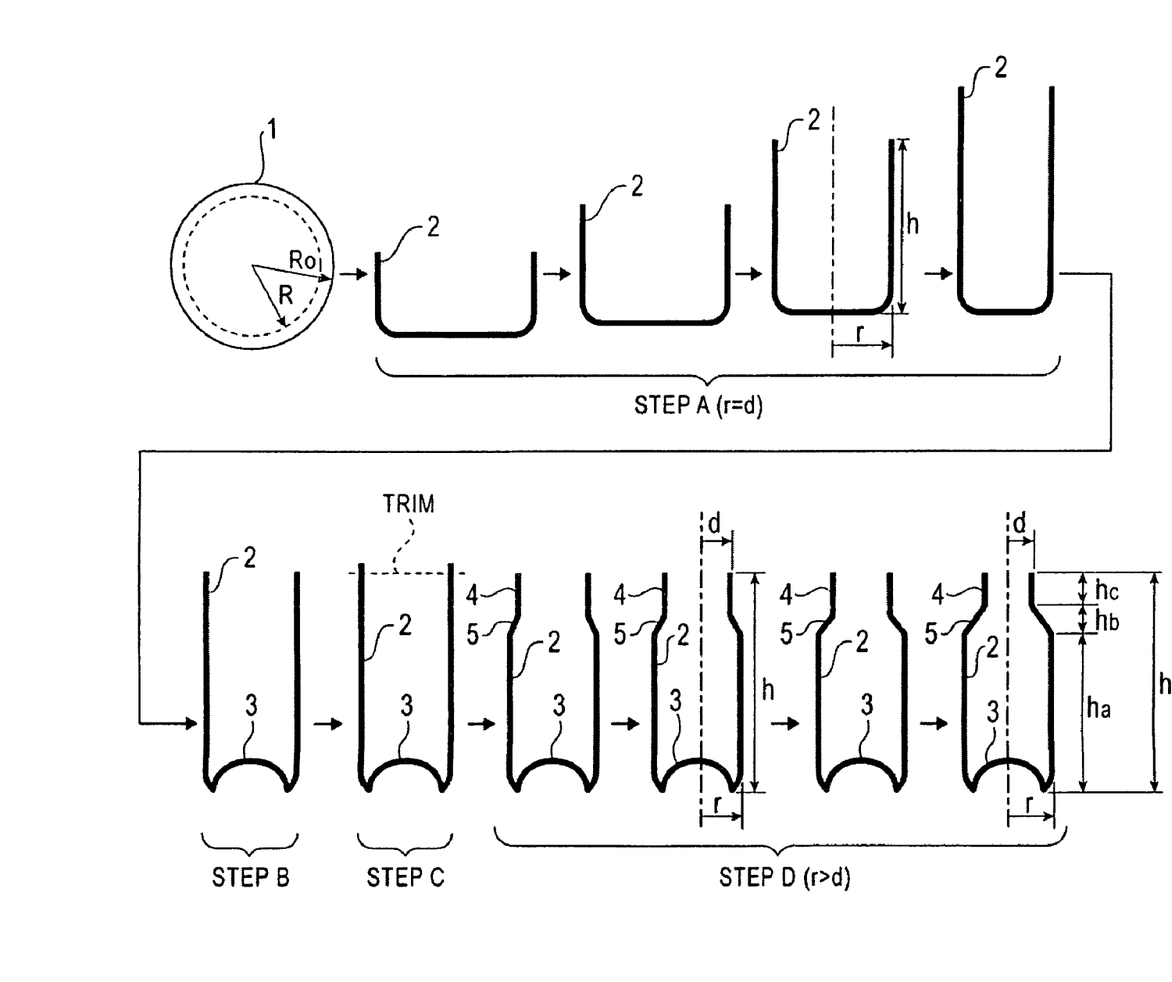
FIG. 1 is a diagram for explaining a production process of a can body.

FIG. 1 is a diagram that explains a production process of a can body according to one aspect. A procedure is shown in which a circular blank of a laminated steel sheet is formed into a form taking the shape of a hollow cylinder with a bottom by drawing (including working by DI) and, furthermore, the diameter of a portion in the vicinity of the opening portion of the above-described form is reduced, to produce a two-piece can having a diameter reduced in the vicinity of the opening portion. The term "circular" refers to a shape suitable for being subjected to working, e.g., drawing, DI, diameter reduction, and/or flanging. Therefore, the laminated steel sheet to be used for working includes sheets in the shapes of nearly a disk, a distorted disk, and an ellipse, as well as a disk.

In FIG. 1, reference numeral 1 denotes a circular blank (blank sheet) before working, reference numeral 2 denotes a straight wall portion (in step D, a straight wall portion not subjected to diameter-reduction working) of a can body, reference numeral 3 denotes a dome-shaped portion, reference numeral 4 denotes a neck-shaped portion which is a diameter-reduced straight wall portion, and reference numeral 5 denotes a taper-shaped portion which is a tapered wall portion after diameter-reduction working.

The circular blank 1 is subjected to a single stage or a plurality of stages of drawing (including DI) to be formed into a form having a predetermined can radius (radius r: radius of outer surface of can) and taking the shape of a hollow cylinder with a bottom (Step A). Doming is performed, wherein the bottom of the form is formed into an upward convex shape to form a dome-shaped portion 3 (Step B). Furthermore, the opening-side end portion of the form is trimmed (Step C). Subsequently, the opening-side portion of the form is subjected to a single stage or a plurality of stages of diameter-reduction working to reduce the diameter of the opening-side portion of the form to a predetermined can radius (radius d: radius of outer surface of can) and, thereby, a desired final form (two-piece can) is produced. In FIG. 1, $R_0$ represents the radius of the circular blank 1 before forming ($R_0$ of an ellipse is an average of a major radius and a minor radius), h, r, and d represent the height, the maximum radius, and the minimum radius, respectively, of a form in a middle stage of forming or a final form, and R represents the radius of the circular sheet before forming having the weight equivalent to the weight of the final form.

The value of $R_0$ is determined by adding an amount of trimming to the value of R calculated from the final form, and is determined optionally. However, the portions trimmed off the form are waste. Industrially, the trim is desired to be minimized. The trim is usually 10% or less, and is 20% or less at most. That is, in many cases, the value of $R_0$ is within the range of 1 to 1.1 times the value of R, and 1 to 1.2 times at the maximum. Therefore, the timing of performing the heat treatment in an intermediate stage can be found by using a value of $R=R_0/1.05$, for example. In the case where a plurality of can bodies is produced, the value of R can be found through prototypes.

In the production process of a can body of a two-piece can, the maximum radius r and the minimum radius d are equal, that is, r=d, in Step A, and r>d in Step D.

The radius R of the circular sheet before forming having the weight equivalent to the weight of the final form is determined on the basis of the measured weight of the final form. That is, the weight of the final form is measured, the dimension (radius) of a circular sheet of the laminated steel sheet before forming, the circular sheet having the same weight as the weight of the final form, is determined by calculation, and the resulting radius is taken as the radius R of the circular sheet before forming having the weight equivalent to the weight of the final form. Although the can end portion is trimmed during the production process of the can body, the influence of the trim has been excluded from the radius R of the circular sheet before forming having the weight equivalent to the weight of the final form. Therefore, the strain can be evaluated more appropriately.

As described above, in the two-piece can produced by applying the drawing (including DI) and the diameter-reduction working to the circular blank of the resin-laminated steel sheet, the resin layer is stretched in the height direction and compressed in the circumferential direction. As the strain becomes high, the amount of deformation of the resin increases to cause breakage of the resin layer. Not only a parameter d/R representing the degree of compression, but also a parameter $h/(R-r)$ related to the elongation in the can height direction are used as indices of the strain. This is because the amount of elongation is needed to be included, in addition to the drawing ratio, for expressing the strain in a high-strain region. That is, the degree of deformation of the resin layer is quantified by specifying the strain on the basis of the degree of compression and the degree of elongation. The resin layer is stretched in the height direction and compressed in the circumferential direction so as to easily peel. Consequently, the amount of elongation in the height direction is also an important factor in addition to the degree of compression.

Regarding the strain of the finally produced can body (final form), the height h, the maximum radius r, and the minimum radius d of the final form are specified to be within the range suitable for satisfying the can radii, $0.11 \leq d/R \leq 0.25$ and $1.5 \leq h/(R-r) \leq 4$, relative to the radius R of the circular sheet before forming having the weight equivalent to the weight of the final form.

As described above, it could be advantageous to make it possible to produce a high-strain can body by using a laminated steel sheet, while the production by the known technology is difficult. Regarding the known technology, it is difficult to produce a high-strain can body satisfying both the parameter d/R specifying the degree of compression of 0.25 or less and the parameter $h/(R-r)$ specifying the degree of elongation of 1.5 or more by using the laminated steel sheet. Therefore, regarding the strain of the can body to be produced, the d/R is 0.25 or less, and the $h/(R-r)$ is 1.5 or more. Moreover, from the viewpoint of production of a higher-strain can body, a forming condition, in which the parameter $h/(R-r)$ specifying the degree of elongation is set at 2.0 or more, is also included.

This is because if the strain is high and the parameter d/R specifying the degree of compression becomes 0.1 or less or the parameter $h/(R-r)$ specifying the degree of elongation exceeds 4, the number of forming stages increases significantly even if forming is possible, or the limit of elongation of the sheet is reached due to work-hardening to cause a sheet breakage problem. Therefore, regarding the strain of the can body, $0.1 \leq d/R$ and $h/(R-r) \leq 4$ are specified.

The multistage forming is working by any one of drawing, DI, and diameter reduction or a combination thereof. In the case where diameter reduction is included, the dimension d of the final form satisfies r>d. If diameter reduction is not included, regarding the dimension of the final form, r=d (each of r and d represents a can radius of the final form) is satisfied.

Preferably, the laminated steel sheet serving as a raw material is a steel sheet coated with a polyester resin.

This is because the steel sheet is inexpensive and cost-effective as compared to aluminum and the like. For the steel sheet, in general, tin-free steel, tinplate, and the like are favorably used. Preferably, the tin-free steel includes, for example, a metal chromium layer with an amount of adhesion of 50 to 200 $mg/m^2$ and a chromium oxide layer with an amount of adhesion of 3 to 30 $mg/m^2$ in terms of metal chromium on the surface. Preferably, the amount of plating of tinplate is 0.5 to 15 $g/m^2$. The sheet thickness is not specifically limited. For example, a sheet thickness within the range of 0.15 to 0.30 mm can be adopted. If economic efficiency is not taken into consideration, aluminum raw materials can be used.

The resin layer is limited to polyester resin, because the resin layer is required to have thermoplasticity to follow working, and elongation and strength are well-balanced.

The working region is a region in which the strain is higher than ever and, in particular, the region in which the degree of compression in the can circumference region is large.

In such a working region, the film not only compresses significantly in the circumferential direction, but also stretches significantly in the height direction. As a result, increases and decreases in the film thickness occur, so that deformation becomes three-dimensional. Therefore, if a heat treatment is not performed in an intermediate stage, peeling of the resin layer due to a significant increase of the internal stress cannot be avoided. The heat treatment in the intermediate stage of forming is effective for relaxing the internal stress. However, the workability deteriorates due to orientational crystallization. That is, when heat treatment is performed, crystallization of the film along the orientational state is facilitated. As a result, the main molecular chain density in the circumferential direction decreases, the bonding force in the circumferential direction decreases, and breakage of the film easily occurs. Therefore, the heat treatment is necessary, but the treatment is not performed without limitation.

We found that the adhesion to the substrate was able to be recovered and the deterioration of workability was minimized by specifying the timing of heat treatment and heat treatment condition. Thus, peeling, cracking or the like did not occur during the downstream working, and produced a good can body.

The timing of the heat treatment is in the intermediate forming stage in which the height h, the maximum radius r, and the minimum radius d (including the case where r and d are equal) of the intermediate stage form satisfy the relationships of $0.2 \leq d/R \leq 0.5$ and $1.5 \leq h/(R-r) \leq 2.5$ relative to the radius R of the circular sheet before forming, the weight of the circular sheet being equivalent to the weight of the final form. The reason is that the strain within this range leads to the most effective heat treatment from the viewpoint of prevention of breakage and peeling of the resin layer. That is, if the heat treatment is performed at a low-strain stage, the above-described effect is small, because the internal stress is relaxed at the stage where the internal stress is not high. In addition, the workability deteriorates, because orientational crystallization of the resin is facilitated. If the heat treatment is performed at an excessively high-strain stage, the adhesion of the resin decreases and, as a result, peeling may occur. Accordingly, the timing of the heat treatment is very important and, therefore, the upper and the lower limit of the strain are specified as described above.

The heat treatment can be performed in any one of Step A and Step D in the production process as shown in FIG. 1 or in both steps. Regarding the above-described timing of the heat treatment, the case where r and d are equal is included on the ground that the heat treatment in Step A is also effective in the can production process including diameter reduction working, or r and d become the same radius in the can production process not including diameter reduction working. The above-described heat treatment may be performed a plurality of times depending on the need for relaxation of the internal stress.

The heat treatment temperature condition relaxes the internal stress generated by working. Specifically, adhesion is recovered. As working proceeds, the internal stress due to working accumulates in the resin layer. This internal stress is a force directed toward compression against elongation and directed toward elongation against compression. The resin layer tends to deform by this force, but is in the state of being unable to deform because of being held by adhesion to the substrate steel sheet. Therefore, if the internal stress accumulates due to working and becomes relatively larger than the adhesion, peeling of the resin layer results. If the adhesion between the resin and the substrate steel sheet is weak, the resin easily peels even when the strain is low.

It is necessary that molecules in the resin layer are in the state of being able to move to some extent to relax the internal stress. From this point of view, a temperature higher than or equal to the glass transition point (Tg) is required. However, even when the temperature is higher than or equal to the glass transition point, if the temperature is too low, the treatment time increases too much. From this point of view, the lower limit temperature of the heat treatment is 150° C. at which an amorphous polyethylene terephthalate resin begins to flow. The upper limit temperature is the melting point of the polyester resin. This is because if the temperature exceeds the melting point of the polyester resin, the film is melted, the resin of the film surface flows and roughens the film surface and, as a result, the appearance is impaired, the film strength is reduced, and the workability in the downstream step is affected.

The lower limit temperature of the heat treatment may also be (the melting point of the polyester resin–30° C.). The reason is described below. This temperature is close to the melting point. In this temperature region, orientational crystallization does not easily proceed in the heat treatment and, therefore, this temperature region is more desirable from the viewpoint of workability. In this manner, a higher-strain can body (final form) can be produced.

The heat treatment method is not specifically limited. It is ascertained that a similar effect is exerted by using an electric furnace, a gas oven, an infrared furnace, an induction heater, or the like. The heating rate and the heating time may be selected appropriately in consideration of both the positive effect due to relaxation of the internal stress and the negative effect due to orientational crystallization. A higher heating rate increases efficiency, and the guideline for the heating time is about 15 to 60 seconds.

After the heat treatment is completed, the temperature is cooled to a temperature lower than or equal to the glass transition point within 10 seconds, because generation of spherulite serving as a factor for impairing the workability can be avoided during cooling.

The region of working is a region in which the orientation of the resin in the can height direction tends to increase because compression in the circumferential direction and elongation in the can height direction increase. It was made clear that the initial orientation of the laminated steel sheet was also important to allow the resin layer to follow the high-strain deformation. That is, the film formed through biaxial orientation or the like is oriented in the plane direction. If the film is in a highly oriented state after lamination, the film cannot follow working and is broken. From this point of view, the plane orientation coefficient is 0.06 or less.

The resin to be used for the lamination layer is produced by polycondensation of dicarboxylic acid and diol. Preferably, the resin contains terephthalic acid and at least one type of diol selected from ethylene glycol and butylene glycol as primary components of polymerization. The term "primary components of polymerization" refers to components constituting 70 to 100 percent by mole of the resin used for the lamination layer, preferably 85 percent by mole or more, and more preferably 92 percent by mole or more. A favorably used resin may be a copolymer in which secondary component is at least one type selected from the group consisting of diethylene glycol, cyclohexanediol, and isophthalic acid.

Furthermore, these favorable resins contain the polyester resin having a plane orientation coefficient of 0.06 or less as a main phase and may further contain a resin, which is incompatible with the main phase and which has a glass transition point of 5° C. or lower, and more preferably –20° C. or lower, as a subphase.

The plane orientation coefficient is specified as described above, because if the plane orientation coefficient exceeds 0.06, workability tends to deteriorate. The resin type of the poly-ester resin is specified as described above, because the balance between elongation and strength of the resin is suitable for working. A resin exhibiting poor elongation cannot be worked up to the desired strain. The resin having poor strength may be broken due to friction over a tool.

It is specified that the above-described resin is the main phase and a resin, which is incompatible with the main phase and which has a glass transition point of 5° C. or lower, is contained as the subphase. This is because deformation of the incompatible portion (subphase) has an effect of relaxing the orientation itself and an effect of relaxing the internal stress. At that time, it is preferable that the incompatible portion (subphase) is easy to deform. For that purpose, the resin having a glass transition point of 5° C. or lower is favorable.

Examples of the above-described resin which is incompatible with the main phase and which has a glass transition point of 5° C. or lower include polypropylene, polyethylene, acid-modified products thereof, ionomers, poly-4-methylpentene-1, polyisobutylene, polyvinylidene chloride, polyethyl acrylate, and polybutadiene. Among them, at least one type selected from polypropylene, polyethylene, acid-modified products thereof, and ionomers is used favorably.

To exert the above-described effects, preferably, the volume ratio of the subphase is 3 percent by volume or more, and 30 percent by volume or less in the mixed resin, in which the main phase and the subphase are mixed. When the volume ratio is 3 percent by volume or more, the effect of the subphase is easy to exert. When the volume ratio is 30 percent by volume or less, subphase particles are stably present in the resin layer.

The laminated steel sheet may be used after addition of adhesives, e.g., a pigment, a lubricant, and a stabilizer, to the resin layer. In addition to the resin layer, a resin layer having other functions may be disposed as an intermediate layer between the above-described resin and the upper layer or the substrate steel sheet.

The film thickness of the resin layer is not specifically limited, but preferably is 10 μm or more, and 50 μm or less. The reason is described below. Regarding the film laminate, in general, the cost of a film of 10 μm or less is high. As the film thickness increases, workability becomes better, but the cost increases. If the film thickness exceeds 50 μm, the cost increases, but the contribution to workability is saturated.

Regarding the laminated steel sheet, at least one surface of the steel sheet is coated with the resin layer.

The method of lamination on the steel sheet is not specifically limited. A heat bonding method, in which a biaxially oriented film or a non-oriented film is heat-bonded, an extrusion method, in which a resin layer is directly formed on a steel sheet by using, for example, a T-die, or the like may be selected appropriately. It has been ascertained that any one of them can exert an adequate effect. To form such a laminated steel sheet by using a biaxially oriented film having a high plane orientation coefficient, it is preferable to increase the temperature during lamination and adequately melt the oriented crystal. Alternatively, a film formed by the extrusion method is almost non-oriented and, therefore, is favorable from this point of view. Likewise, the direct lamination method, in which a molten resin is directly laminated on a steel sheet, is favorable for the same reason.

EXAMPLE 1

An example will be described below.
"Preparation of Laminated Steel Sheet"

Various resin layers were formed by using TFS (metal Cr layer: 120 mg/m$^2$, Cr oxide layer: 10 mg/m$^2$ in terms of metal Cr) of T4CA having a thickness of 0.20 mm and by applying a film lamination method (heat bonding method) or a direct lamination method (direct extrusion method) to this original sheet. Two types of film lamination by using a biaxially oriented film and a non-oriented film were performed. A laminated steel sheet was prepared by laminating a film having a thickness of 25 μm on each of the two surfaces of the metal sheet.

The plane orientation coefficient of the polyester resin film applied on the laminated steel sheet prepared as described above was calculated in the following manner.
"Measurement of Plane Orientation Coefficient"

The refractive index was measured by using an Abbe refractometer under the condition of a light source of sodium D line, an intermediate solution of methylene iodide, and a temperature of 25° C. The refractive index Nx in the machine direction of the film surface, the refractive index Ny in the transverse direction of the film surface, and the refractive index Nz in the thickness direction of the film were determined. Subsequently, the plane orientation coefficient Ns was calculated by the following formula:

$$\text{Plane orientation coefficient}(Ns)=(Nx+Ny)/2-Nz.$$

The method for manufacturing the laminated steel sheet and the contents of the prepared laminated steel sheet are shown in Table 1. The types of resins described in Table 1 are as described below:
PET: polyethylene terephthalate
PET-I(12): polyethylene terephthalate-isophthalate copolymer (isophthalic acid copolymerization ratio 12 percent by mole)
PET-I(5): polyethylene terephthalate-isophthalate copolymer (isophthalic acid copolymerization ratio 5 percent by mole)
PET-PBT(60): polyethylene terephthalate-butylene terephthalate copolymer (butylene terephthalate copolymerization ratio 60 percent by mole)
PET-DEG: polyethylene terephthalate-diethylene glycol copolymer
PET-CHDM: polyethylene terephthalate-cyclohexanediol copolymer
PET-PE: the main phase is PET, the subphase is polyethylene (Tg: −125° C.), and the content is 15 percent by volume
PET-PP: the main phase is PET, the subphase is polypropylene (Tg: −20° C.), and the content is 13 percent by volume
PET-IO: the main phase is PET, the subphase is ionomer (ethylene-unsaturated carboxylic acid copolymer Zn neutralization product, Tg: −30° C. or lower), and the content is 14 percent by volume.

The lamination methods are described below.
Heat Bonding Method 1:

A film formed through a biaxial orientation method was heat-bonded with a nip roll to a steel sheet in the state of being heated to (the melting point of the resin+10° C.), and cooling with water was performed within 7 seconds.
Heat Bonding Method 2:

A non-oriented film was heat-bonded with a nip roll to a steel sheet in the state of being heated to (the melting point of the resin+10° C.), and cooling with water was performed within 7 seconds.
Direct Extrusion Method:

Resin pellets were kneaded and melted in an extruder, and supplied from a T-die to a running steel sheet so as to be applied. Subsequently, the resin-coated steel sheet was subjected to nip cooling with a cooling roll at 80° C., and was further cooled with water.

Regarding a painted steel sheet of a comparative example, thermosetting epoxy resin was applied and was heated at 220° C. for 10 minutes to form a coating film having a thickness of 8 μm.
"Formation of can Body"

A can body (final form) was produced by using the prepared steel sheet specimen in the following procedure based on the production process as shown in FIG. 1. The shapes of the intermediate form (Step C) and the final form (Step D) are shown in Table 2. Drawing in Step A was performed in five stages, and the diameter reduction working in Step D was performed in seven stages. Heat treatment was performed in a middle stage of Step A to Step D. The can body was heated by using an infrared furnace and water-cooled after the heat treatment was completed. The timing of heat treatment (the strain of the can body when the heat treatment was performed) and the heat treatment condition are shown in Table 3.

In Table 2, h, r, d, ha, hc, and R of the final form (Step D) represent the height up to the opening end portion of the final form, the radius of the can body (2), the radius of the neck-shaped portion 3, the height of the can body (2), the height of the neck-shaped portion 3, and the radius of the circular sheet blank before forming having a weight equivalent to the weight of the final form, respectively (refer to FIG. 1). The radius R of the circular sheet blank was determined as described below. The weight of the blank sheet before forming and the weight of the final form after the trimming step were measured. The radius of the blank sheet before forming having a weight equivalent to the weight of the final form is determined on the basis of the measurement results. The resulting radius was taken as the radius R of the blank sheet before forming having a weight equivalent to the weight of the final form.

1) Blanking (diameter of blank sheet: 66 and 82 mmØ)
2) Drawing and ironing (Step A)

The can body (intermediate form), in which the radius r and the height h of the can body are within the range satisfying the r/R of 0.23 to 0.47 and the h/(R−r) of 1.50 to 3.05, was prepared by five-stage drawing. Ironing was performed in combination appropriately to prepare a desired can body.

3) Doming of can Bottom (Step B)

The can bottom was subjected to working to form a protrusion into the shape of a hemisphere having a depth of 6 mm.

4) Trimming (Step C)

An upper end portion of the can was trimmed by about 2 mm.

5) Diameter-Reduction Working of Upper Portion of Cylinder (Step D)

The upper portion of the cylinder was subjected to diameter-reduction working. Specifically, a die neck system was applied, wherein the opening end portion was pressed against a die with a taper-shaped inner surface and diameter-reduction was performed, so that the can body was produced while taking a final can body shape as shown in Table 2.

Adhesion, workability, and appearance of the film layer of the can body produced in the above-described procedure were evaluated in the following manner. The evaluation results are also shown in Table 3.

"Adhesion Test"

The can body was shorn into the shape of nearly a rectangle in the can height direction in such a way that the width in the circumferential direction became 15 mm. Merely the steel sheet at the position 10 mm from the bottom surface in the can height direction was shorn linearly in the circumferential direction. As a result, a test piece composed of a 10-mm portion in the bottom surface side in the can height direction and the remainder portion with the shearing position, which was a boundary, therebetween was formed. A steel sheet of 15 mm width and 60 mm length was joined (welded) to the 10-mm portion, and the film of the remainder portion was peeled by about 10 mm from the breakage position while the 60-mm steel sheet portion was grasped. A peeling test in a 180-degree direction was performed while the portion, from which the film had been peeled, and the 60-mm steel sheet portion were allowed to serve as a handgrip. The minimum value of the observed peel strength was taken as the index of the adhesion.

(Peel Strength)
less than 4 N/15 mm: x
4 N/15 mm or more: ○

"Evaluation of Film Workability"

A film with a small window of 15 mmØ was affixed in such a way that the center of the film was positioned at 10 mm from the can upper end and the measurement area became 15 mmØ. Subsequently, the small window portion was dipped into an electrolytic solution (KCl: 5-percent solution, temperature was room temperature), and a voltage of 6.2 V was applied between the steel sheet and the electrolytic solution. The evaluation was performed as described below on the basis of the current value measured at this time.

(Current Value)
0.1 mA or less: ⊙
more than 0.1 mA, and 1.0 mA or less: ○
more than 1.0 mA: x "Evaluation of Appearance"

The appearance of the neck-shaped portion of the produced can was visually evaluated.
rough surface was observed: x
rough surface was not observed: ○

"Evaluation Results"

Can bodies C1 to C12 and C14 to C30 are our examples, and all of film adhesion, workability, and appearance were good.

Can body C 13 is an example as well. In this example, the cooling time was out of the preferable range. All of film workability, adhesion, and appearance were good, although the workability was evaluated as ○.

In Can body C31, the resin layer was coated with a thermosetting paint out of our range. All of workability, adhesion, and appearance were evaluated as x.

Regarding Can body C32, the heat treatment temperature was out of the upper limit of our range. The appearance was evaluated as x.

Regarding Can bodies C33 to C35, the timing of the heat treatment was out of our range. Workability was evaluated as ○, and adhesion was evaluated as x.

Regarding Can body C36, the plane orientation coefficient was out of our range. Film workability was evaluated as x.

Regarding Can body C37, the heat treatment temperature was out of the lower limit of our range. The film adhesion was evaluated as x.

According to our methods, a can body for a high-strain two-piece can may be produced from a laminated steel sheet material without peeling nor breakage of a resin layer. The can body for a two-piece can can be favorably used as a can body of a high-strain two-piece can, e.g., an aerosol can.

TABLE 1

| Steel sheet specimen No. | Type of resin | Melting point (° C.) | Lamination method | Plane orientation coefficient | Remarks |
| --- | --- | --- | --- | --- | --- |
| A1 | PET-I(12) | 228 | Heat bonding method 1 | 0.02 | invention steel sheet |
| A2 | PET-I(5) | 245 | Heat bonding method 1 | 0.02 | invention steel sheet |
| A3 | PET | 258 | Heat bonding method 1 | 0.02 | invention steel sheet |
| A4 | PET-PBT(60) | 251 | Heat bonding method 1 | 0.02 | invention steel sheet |
| A5 | PBT | 220 | Heat bonding method 1 | 0.02 | invention steel sheet |
| A6 | PET-I(12) | 228 | Heat bonding method 1 | 0.04 | invention steel sheet |
| A7 | PET-PE | 258 | Heat bonding method 1 | <0.01 | invention steel sheet |
| A8 | PET-PP | 258 | Heat bonding method 1 | <0.01 | invention steel sheet |
| A9 | PET-IO | 258 | Heat bonding method 1 | <0.01 | invention steel sheet |
| A10 | PET-I(12) | 228 | Heat bonding method 2 | 0.02 | invention steel sheet |
| A11 | PET-I(12) | 228 | Direct extrusion method | 0.02 | invention steel sheet |
| A12 | PET-I(12) | 228 | Heat bonding method 1 | 0.06 | invention steel sheet |
| A13 | PET-PBT(60) | 251 | Heat bonding method 2 | <0.01 | invention steel sheet |
| A14 | PET-DEG | 248 | Heat bonding method 2 | <0.01 | invention steel sheet |
| A15 | PET-CHDM | 249 | Heat bonding method 2 | <0.01 | invention steel sheet |

TABLE 1-continued

| Steel sheet specimen No. | Type of resin | Melting point (° C.) | Lamination method | Plane orientation coefficient | Remarks |
|---|---|---|---|---|---|
| A16 | Thermosetting epoxy resin | — | Painting | — | comparative steel sheet |
| A17 | PET-I(12) | 228 | Heat bonding method 1 | 0.08 | comparative steel sheet |

TABLE 2

| Can body shape | Blank radius $R_0$(mm) | Intermediate form (step C) | | Final form (step D) | | | | | | | | Sheet thickness change rate** |
|---|---|---|---|---|---|---|---|---|---|---|---|---|
| | | r(mm) | h(mm) | r(mm) | d(mm) | h(mm) | ha(mm) | hc(mm) | Blank radius R(mm)* | d/R | h/(R − r) | |
| B1 | 41.0 | 11.0 | 63.6 | 11.0 | 7.8 | 65.9 | 47.0 | 9.9 | 40.4 | 0.19 | 2.24 | 1.20 |
| B2 | 33.0 | 11.0 | 63.5 | 11.0 | 7.8 | 65.9 | 47.0 | 9.9 | 32.2 | 0.24 | 3.11 | 0.65 |

*A blank radius R is a blank radius converted on the basis of the weight of a final form.
**Sheet thickness of blank sheet divided by sheet thickness of minimum thickness portion of can body, where each sheet thickness is steel sheet thickness.

TABLE 3

| Can body No. | Laminated steel sheet No. | Resin layer melting point (° C.) | Strain in heat treatment | | Heat treatment condition | | Cooling time* |
|---|---|---|---|---|---|---|---|
| | | | d/R | h/(R − r) | Temperature | Time | |
| C1 | A4 | 251 | 0.30 | 1.50 | 245° C. | 30 seconds | 8 seconds |
| C2 | A4 | 251 | 0.30 | 1.50 | 245° C. | 60 seconds | 8 seconds |
| C3 | A4 | 251 | 0.30 | 1.50 | 245° C. | 90 seconds | 8 seconds |
| C4 | A4 | 251 | 0.30 | 1.50 | 245° C. | 120 seconds | 8 seconds |
| C5 | A4 | 251 | 0.30 | 1.50 | 250° C. | 30 seconds | 8 seconds |
| C6 | A4 | 251 | 0.30 | 1.50 | 220° C. | 45 seconds | 8 seconds |
| C7 | A4 | 251 | 0.30 | 1.50 | 200° C. | 60 seconds | 8 seconds |
| C8 | A4 | 251 | 0.30 | 1.50 | 160° C. | 90 seconds | 8 seconds |
| C9 | A4 | 251 | 0.30 | 1.50 | 245° C. | 30 seconds | 1 seconds |
| C10 | A4 | 251 | 0.30 | 1.50 | 245° C. | 30 seconds | 2 seconds |
| C11 | A4 | 251 | 0.30 | 1.50 | 245° C. | 30 seconds | 4 seconds |
| C12 | A4 | 251 | 0.30 | 1.50 | 245° C. | 30 seconds | 6 seconds |
| C13 | A4 | 251 | 0.30 | 1.50 | 245° C. | 30 seconds | 15 seconds |
| C14 | A4 | 251 | 0.38 | 1.79 | 245° C. | 30 seconds | 8 seconds |
| C15 | A4 | 251 | 0.23 | 2.20 | 245° C. | 30 seconds | 8 seconds |
| C16 | A4 | 251 | 0.47 | 1.55 | 245° C. | 30 seconds | 8 seconds |
| C17 | A1 | 228 | 0.30 | 1.50 | 220° C. | 30 seconds | 8 seconds |
| C18 | A2 | 245 | 0.30 | 1.50 | 240° C. | 30 seconds | 8 seconds |
| C19 | A3 | 258 | 0.30 | 1.50 | 250° C. | 30 seconds | 8 seconds |
| C20 | A5 | 220 | 0.30 | 1.50 | 210° C. | 30 seconds | 8 seconds |
| C21 | A6 | 228 | 0.30 | 1.50 | 220° C. | 30 seconds | 8 seconds |
| C22 | A7 | 258 | 0.30 | 1.50 | 250° C. | 30 seconds | 8 seconds |
| C23 | A8 | 258 | 0.30 | 1.50 | 250° C. | 30 seconds | 8 seconds |
| C24 | A9 | 258 | 0.30 | 1.50 | 220° C. | 30 seconds | 8 seconds |
| C25 | A10 | 228 | 0.30 | 1.50 | 220° C. | 30 seconds | 8 seconds |
| C26 | A11 | 228 | 0.30 | 1.50 | 220° C. | 30 seconds | 8 seconds |
| C27 | A12 | 228 | 0.30 | 1.50 | 220° C. | 30 seconds | 8 seconds |
| C28 | A13 | 251 | 0.30 | 1.50 | 240° C. | 30 seconds | 8 seconds |
| C29 | A14 | 248 | 0.30 | 1.50 | 240° C. | 30 seconds | 8 seconds |
| C30 | A15 | 249 | 0.30 | 1.50 | 240° C. | 30 seconds | 8 seconds |
| C31 | A16 | — | 0.30 | 1.50 | 220° C. | 30 seconds | 8 seconds |
| C32 | A4 | 251 | 0.30 | 1.50 | 265° C. | 30 seconds | 8 seconds |
| C33 | A4 | 251 | 0.34 | 3.00 | 220° C. | 30 seconds | 8 seconds |
| C34 | A4 | 251 | 0.28 | 3.00 | 220° C. | 30 seconds | 8 seconds |
| C35 | A4 | 251 | 0.26 | 3.05 | 220° C. | 30 seconds | 8 seconds |
| C36 | A17 | 228 | 0.30 | 1.50 | 220° C. | 30 seconds | 8 seconds |
| C37 | A4 | 251 | 0.30 | 1.50 | 130° C. | 30 seconds | 8 seconds |

TABLE 3-continued

| Can body No. | Final can body shape | Film workability | Film adhesion | Appearance | Remarks |
|---|---|---|---|---|---|
| C1 | B1 | ⊙ | ○ | ○ | invention example |
| C2 | B1 | ⊙ | ○ | ○ | invention example |
| C3 | B1 | ⊙ | ○ | ○ | invention example |
| C4 | B1 | ⊙ | ○ | ○ | invention example |
| C5 | B1 | ⊙ | ○ | ○ | invention example |
| C6 | B1 | ⊙ | ○ | ○ | invention example |
| C7 | B1 | ⊙ | ○ | ○ | invention example |
| C8 | B1 | ⊙ | ○ | ○ | invention example |
| C9 | B1 | ⊙ | ○ | ○ | invention example |
| C10 | B1 | ⊙ | ○ | ○ | invention example |
| C11 | B1 | ⊙ | ○ | ○ | invention example |
| C12 | B1 | ⊙ | ○ | ○ | invention example |
| C13 | B1 | ○ | ○ | ○ | invention example |
| C14 | B1 | ⊙ | ○ | ○ | invention example |
| C15 | B1 | ⊙ | ○ | ○ | invention example |
| C16 | B1 | ⊙ | ○ | ○ | invention example |
| C17 | B1 | ⊙ | ○ | ○ | invention example |
| C18 | B1 | ⊙ | ○ | ○ | invention example |
| C19 | B1 | ⊙ | ○ | ○ | invention example |
| C20 | B1 | ⊙ | ○ | ○ | invention example |
| C21 | B1 | ⊙ | ○ | ○ | invention example |
| C22 | B1 | ⊙ | ○ | ○ | invention example |
| C23 | B1 | ⊙ | ○ | ○ | invention example |
| C24 | B1 | ⊙ | ○ | ○ | invention example |
| C25 | B1 | ⊙ | ○ | ○ | invention example |
| C26 | B1 | ⊙ | ○ | ○ | invention example |
| C27 | B1 | ⊙ | ○ | ○ | invention example |
| C28 | B1 | ⊙ | ○ | ○ | invention example |
| C29 | B1 | ⊙ | ○ | ○ | invention example |
| C30 | B1 | ⊙ | ○ | ○ | invention example |
| C31 | B1 | X | x | X | comparative example (steel sheet specimen is out of the range of the invention) |
| C32 | B1 | ⊙ | ○ | X | comparative example (heat treatment temperature is out of the range) |
| C33 | B2 | ○ | X | ○ | comparative example (timing of heat treatment is inappropriate) |
| C34 | B2 | ○ | X | ○ | comparative example (timing of heat treatment is inappropriate) |
| C35 | B2 | ○ | X | ○ | comparative example (timing of heat treatment is inappropriate) |
| C36 | B1 | X | ○ | ○ | comparative example (steel sheet specimen is out of the range of the invention) |
| C37 | B1 | ○ | X | ○ | comparative example (heat treatment temperature is inappropriate) |

*Time required for cooling to a temperature lower than or equal to Tg after the heat treatment is completed.

INDUSTRIAL APPLICABILITY

According to our methods, a can body for a laminated steel sheet two-piece can may be produced, wherein the can body has a high strain and a resin layer does not include peeling nor breakage. In the laminated steel sheet, an inexpensive, thin, high-strength steel sheet, e.g., tinplate or tin-free steel, is coated with a resin film. Therefore, for example, a can body of a high-strain two-piece can, e.g., an aerosol can, can be inexpensively provided, while high strength, high corrosion resistance, and the like are also provided in combination. Consequently, the industrial significance is very high.

The invention claimed is:

1. A method of manufacturing a can body for a two-piece can with multistage forming of a circular laminated steel sheet having a radius of $R_0$, comprising:
producing at least two forms by stepwise drawing a laminated steel sheet coated with a polyester resin, which has a plane orientation coefficient of 0.06 or less such that height h, maximum radius r, and minimum radius d of the form satisfy $0.2 \leq d/R \leq 0.5$, and $1.5 \leq h/(R-r) \leq 2.5$, where R represents radius of the laminated steel sheet having a weight equivalent to the weight of a final form;
an intermediate forming stage comprising heat-treating the resulting forms after each drawing at a temperature of 150° C. or higher, and lower than or equal to the melting point of the polyester resin; and
working the heat-treated form into a form satisfying $d \leq r$, $0.1 \leq d/R \leq 0.25$, and $1.5 \leq h/(R-r) \leq 4$,
wherein the polyester resin is a resin in which primary components of polymerization are terephthalic acid and at least one diol selected from the group consisting of ethylene glycol and butylene glycol and wherein the polyester resin further comprises an incompatible resin having a glass transition point of 5° C. or lower as a subphase.

2. The method according to claim 1, wherein the polyester resin is a copolymer in which a secondary component is at least one selected from the group consisting of diethylene glycol, cyclohexanediol, and isophthalic acid.

3. A method for manufacturing a two-piece can with multistage forming of a circular sheet of a laminated steel sheet to finally produce a final form having a height h, a maximum radius r, and a minimum radius d (including when r and d are equal), comprising:

providing a laminated steel sheet coated with a polyester resin having a plane orientation coefficient of 0.06 or less and wherein the polyester resin is a resin in which primary components of polymerization are terephthalic acid and at least one diol selected from the group consisting of ethylene glycol and butylene glycol wherein the polyester resin further comprises an incompatible resin having a glass transition point of 5° C. or lower as a subphase; and     stepwise drawing the laminated steel sheet within a range suitable for allowing the height h, the maximum radius r, and the minimum radius d of the final form to satisfy the relationships of $0.1 \leq d/R \leq 0.25$ and $1.5 \leq h/(R-r) \leq 4$ relative to the radius R of the circular sheet before forming, the weight of the circular sheet being equivalent to the weight of the final form; and     heat-treating each resulting form such that temperature of the form becomes 150° C. or higher, and lower than or equal to the melting point of the polyester resin, in an intermediate forming stage in which the height h, the maximum radius r, and the minimum radius d of the form in the intermediate forming stage satisfy the relationships of $0.2 \leq d/R \leq 0.5$ and $1.5 \leq h/(R-r) \leq 2.5$ relative to the radius R.

4. A method of manufacturing a can body for a two-piece can with multistage forming of a circular laminated steel sheet having a radius of $R_0$, comprising:

producing a form at least one time by using a laminated steel sheet coated with a polyester resin, which has a plane orientation coefficient of 0.06 or less such that height h, maximum radius r, and minimum radius d of the form satisfy $0.2 \leq d/R \leq 0.5$, and $1.5 \leq h/(R-r) \leq 2.5$, where R represents radius of the laminated steel sheet having a weight equivalent to the weight of a final form;

heat-treating the resulting form at least one time at a temperature of 150° C. or higher such that the temperature of the heat-treating is higher than or equal to the melting point of the polyester resin $-30°$ C., and working condition of the heat-treated form is $d \leq r$, $0.1 \leq d/R \leq 0.25$, and $2.0 \leq h/(R-r) \leq 4$, and lower than or equal to the melting point of the polyester resin; and lower than or equal to the melting point of the polyester resin; and     working the heat-treated form into a form satisfying $d \leq r$, $0.1 \leq d/R \leq 0.25$, and $1.5 \leq h/(R-r) \leq 4$.

\* \* \* \* \*